(12) United States Patent
Tsai (10) Patent No.: US 10,998,836 B2
(45) Date of Patent: May 4, 2021

(54) SYSTEM AND METHOD OF DRIVING MOTOR

(71) Applicant: ANPEC ELECTRONICS CORPORATION, Hsinchu (TW)

(72) Inventor: Ming-Jung Tsai, Changhua County (TW)

(73) Assignee: ANPEC ELECTRONICS CORPORATION, Hsinchu (TW)

(*) Notice: Subject to any disclaimer, the term of this patent is extended or adjusted under 35 U.S.C. 154(b) by 0 days.

(21) Appl. No.: 16/788,214

(22) Filed: Feb. 11, 2020

(65) Prior Publication Data

US 2021/0044226 A1 Feb. 11, 2021

(30) Foreign Application Priority Data

Aug. 7, 2019 (TW) .................................. 108128045

(51) Int. Cl.
*H02P 6/18* (2016.01)
*H02P 6/182* (2016.01)

(52) U.S. Cl.
CPC .................... *H02P 6/182* (2013.01)

(58) Field of Classification Search
CPC ........................................................ H02P 6/12
USPC ...................... 318/400.34, 400.35
See application file for complete search history.

(56) References Cited

U.S. PATENT DOCUMENTS

| 2011/0084640 | A1* | 4/2011 | Brown | H02P 6/182 |
| | | | | 318/400.35 |
| 2011/0257791 | A1* | 10/2011 | Hawker | H02P 6/14 |
| | | | | 700/275 |
| 2017/0133962 | A1* | 5/2017 | Boscolo Berto | H02P 6/185 |
| 2017/0229986 | A1* | 8/2017 | Allegrini | H02P 6/085 |

* cited by examiner

*Primary Examiner* — Erick D Glass
(74) *Attorney, Agent, or Firm* — Li & Cai Intellectual Property (USA) Office (57) ABSTRACT

A system and a method of driving a motor are provided. A zero crossing reference module defines a zero-crossing region based on a current zero-crossing point of a coil of the motor, and a mode switching setting module sets a reference parameter of a back electromotive force when the motor rotates at a preset rotating speed. When the current zero-crossing point fails to fall in the zero-crossing region, a driving mode selector module selects a voltage detection mode. When a parameter of the back electromotive force is equal to the reference parameter, the driving mode selector module selects to switch back to a current detection mode. A motor driving controller module calculates a position of a rotor of the motor based on the current in the current detection mode and determines the position based on the back electromotive force in the voltage detection mode to drive the motor.

11 Claims, 6 Drawing Sheets

SYSTEM AND METHOD OF DRIVING MOTOR

CROSS-REFERENCE TO RELATED PATENT APPLICATION

This application claims the benefit of priority to Taiwan Patent Application No. 108128045, filed on Aug. 7, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor, and more particularly to a system and a method of driving a motor.

BACKGROUND OF THE DISCLOSURE

Temperature control is important for a variety of control systems including a large number of integrated circuits. A high temperature may not only cause the system to run unstably, but also shorten a lifetime of the system, and even burn out some circuit components. A high temperature gas is generated by the integrated circuit, instead of the system. Therefore, a cooling fan is widely used to discharge the high temperature gas to the outside of a chassis so that temperatures of the circuit components are reduced to a normal temperature.

SUMMARY OF THE DISCLOSURE

In response to the above-referenced technical inadequacies, the present disclosure provides a system of driving a motor. The system includes a zero crossing reference module, a mode switching setting module, a driving mode selector module, and a motor driving controller module. The zero crossing reference module is configured to define a zero-crossing region based on a current zero-crossing point of a current of a coil of the motor as a reference point in a preliminary procedure. The current zero-crossing point is aligned with or delayed with respect to a voltage zero-crossing point of a back electromotive force of the motor rotating at a preset rotating speed. The mode switching setting module is configured to set a reference parameter of the back electromotive force of the motor rotating at the preset rotating speed in the preliminary procedure. The driving mode selector module is connected to the zero crossing reference module and the mode switching setting module. When the driving mode selector determines that the current zero-crossing point fails to fall in the zero-crossing region in a current detection mode, the driving mode selector selects to switch from the current detection mode to a voltage detection mode. When the driving mode selector determines that a parameter of the back electromotive force is equal to the reference parameter in the voltage detection mode, the driving mode selector selects to switch back to the current detection mode. The motor driving controller module is connected to the driving mode selector module. The motor driving controller module is configured to calculate a position of a rotor of the motor based on the current to drive the motor when the current detection mode is selected. The motor driving controller module is configured to determine the position of the rotor based on the back electromotive force to drive the motor when the voltage detection mode is selected.

In certain embodiments, when the driving mode selector module determines that the current zero-crossing point of the motor rotating falls in the zero-crossing region, the driving mode selector module selects the current detection mode and the motor rotates in the current detection mode.

In certain embodiments, the system further includes a current mode driver module. The current mode driver module is connected between the driving mode selector module and the motor driving controller module. When the current mode driver module determines that the current zero-crossing point falls in the zero-crossing region, the current mode driver module instructs the driving mode selector module to select to maintain the current detection mode. When the current mode driver module determines that the current zero-crossing point fails to fall in the zero-crossing region, the current mode driver module instructs the driving mode selector module to select to switch to the voltage detection mode.

In certain embodiments, the system further includes a voltage mode driver module. The voltage mode driver module is connected between the driving mode selector module and the motor driving controller module. When the voltage mode driver module determines that the parameter of the back electromotive force is not equal to the reference parameter, the voltage mode driver module instructs the driving mode selector module to select to maintain the voltage detection mode. When the voltage mode driver module determines that the parameter of the back electromotive force is equal to the reference parameter, the voltage mode driver module instructs the driving mode selector module to select to switch from the voltage detection mode back to the current detection mode.

In certain embodiments, the reference parameter includes a time difference between a period of a signal of the back electromotive force and a next period thereof, and the time difference is smaller than a time difference threshold.

In certain embodiments, the reference parameter includes a time difference between each two successive periods of a signal of the back electromotive force within a predetermined time, and the time difference is smaller than a time difference threshold.

In addition, the present disclosure provides a method of driving a motor. The method includes the following steps: (a) defining, by a zero crossing reference module, a zero-crossing region based on a current zero-crossing point of a current of a coil of the motor as a reference point, wherein the current zero-crossing point is aligned with or delayed with respect to a voltage zero-crossing point of a back electromotive force of the motor rotating at a preset rotating speed; (b) setting a reference parameter of the back electromotive force of the motor rotating at the preset rotating speed by a mode switching setting module; (c) calculating a position of a rotor of the motor based on the current to drive the motor in a current detection mode by a motor driving controller module; (d) determining, by a driving mode selector module, whether or not the current zero-crossing point of the motor rotating falls in the zero-crossing region, in response to determining that the current zero-crossing point falls in the zero-crossing region, selecting to maintain the current detection mode and continuingly performing the previous step (c), in response to determining that the current zero-crossing point fails to fall in the zero-crossing region, selecting to switch from the current detection mode to a voltage detection mode; (e) determining the position of the rotor based on the back electromotive force to drive the motor in the voltage detection mode by the motor driving controller module; and (f) determining, by the driving mode selector module, whether or not a parameter of the back electromotive force is equal to the reference parameter in the voltage detection mode, in response to determining that the parameter of the back electromotive force is not equal to the reference parameter, selecting to maintain the voltage detection mode, in response to determining that the parameter of the back electromotive force is equal to the reference parameter, selecting to switch back to the current detection mode and then performing step (c).

In certain embodiments, the method further includes a step of: determining, by the current driving controller module, whether or not the current zero-crossing point falls in the zero-crossing region, in response to determining that the current zero-crossing point falls in the zero-crossing region, instructing the driving mode selector module to select to maintain the current detection mode, in response to determining that the current zero-crossing point fails to fall in the zero-crossing region, instructing the driving mode selector module to select to switch from the current detection mode to the voltage detection mode.

In certain embodiments, the method further includes a step of: determining, by the voltage mode driver module, whether or not the parameter of the back electromotive force is equal to the reference parameter, in response to determining that the parameter of the back electromotive force is not equal to the reference parameter, instructing the driving mode selector module to select to maintain the voltage detection mode, in response to determining that the parameter of the back electromotive force is equal to the reference parameter, instructing the driving mode selector module to select to switch back to the current detection mode.

In certain embodiments, the reference parameter includes a time difference between a period of a signal of the back electromotive force and a next period thereof, and the time difference is smaller than a time difference threshold.

In certain embodiments, the reference parameter includes a time difference between each two successive periods of a signal of the back electromotive force within a predetermined time, and the time difference is smaller than a time difference threshold.

Therefore, the present disclosure provides the system and the method of driving the motor. When the system detects that the current zero-crossing point of the current of the motor falls in the zero-crossing region, and determines that the motor rotates stably, the motor is driven to rotate with low noise in the current detection mode. However, when the current zero-crossing point of the current of the motor fails to fall in the zero-crossing region, the system determines that the fan may be subjected to an external force so that the fan does not rotate stably, the present disclosure selects to switch from the current detection mode to the voltage detection mode. In the voltage detection mode, the voltage zero-crossing point of the back electromotive force of the motor is detected to accurately determine the position of the rotor of the motor.

That is, the present disclosure provides a mode switching mechanism of the voltage detection mode and the current detection mode, which is applied to solve the problem that the motor stalls in the current detection mode when the fan is subjected to the external force of a common motor driver system. Furthermore, the present disclosure can adjust conditions of switching the multiple mode switching mechanisms according to characteristics of different types of fans or motors to ensure that the waveform of the driving signal is corrected so that the motor is driven to rotate stably.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
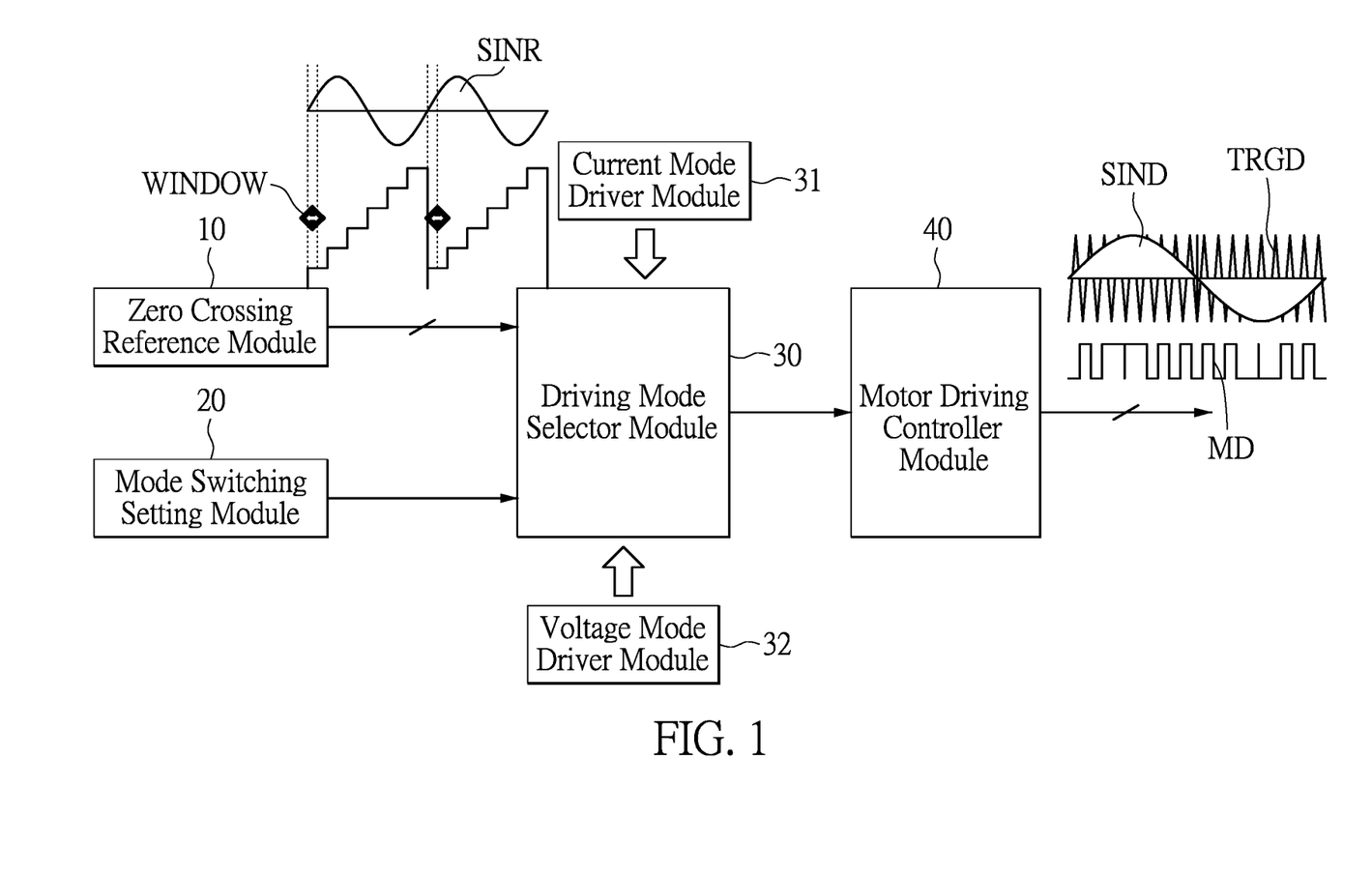
FIG. 1 is a block diagram of a system of driving a motor according to an embodiment of the present disclosure.

Reference is made to FIG. 1, which is a block diagram of a system of driving a motor according to an embodiment of the present disclosure. As shown in FIG. 1, in the embodiment, the system of driving the motor includes a zero crossing reference module 10, a mode switching setting module 20, a driving mode selector module 30 and a motor driving controller module 40. The driving mode selector module 30 is connected to the zero crossing reference module 10, the mode switching setting module 20 and the motor driving controller module 40.

When a motor rotates stably at a preset rotating speed, the zero crossing reference module 10 defines a zero-crossing region WINDOW based on a current zero-crossing point of a current signal SINR of a coil of the motor as a reference point in a preliminary procedure. The current zero-crossing point is a time point at which a current of the current signal SINR is zero.

It should be understood that, when the motor rotates stably and a phase of a driving voltage is aligned with a phase of a back electromotive force, a current zero-crossing point of a current flowing through the coil of the motor is delayed with respect to a voltage zero-crossing point of the driving voltage (and the back electromotive force), which is caused by an inductance characteristic of the coil of the motor. Therefore, a forward position may be estimated based on a position of the current zero-crossing point of the current, and the forward position is as a position of the voltage zero-crossing point of the back electromotive force.

However, a certain degree of fluctuation of the current zero-crossing point of the current may be caused by changes of an integrated circuit, an environment or other factors. Therefore, in the embodiment, the zero crossing reference module 10 defines the zero-crossing region WINDOW based on the current zero-crossing point being the reference point. A position of the current zero-crossing point is aligned with or delayed with respect to a position of the voltage zero-crossing point of the back electromotive force. The zero-crossing region WINDOW may also be called a detection region of a zero-crossing point. The modules included in the system of driving the motor in the embodiment or an additional detector component detects whether the current flowing through the coil of the motor is zero to detect a time point and a position of the current zero-crossing point within a time interval of the detection region.

After the preliminary procedure is completed as described above, a practical procedure is performed. The motor may operate in a current detection mode during the practical procedure. In the current detection mode, the motor driving controller module 40 may obtain a current flowing through the coil of the motor and calculate a position of a rotor of the motor based on the current. The motor driving controller module 40 may determine parameters of a motor controlling signal MD for controlling the motor based on the position of the rotor of the motor. The motor driving controller module 40 may timely input the motor controlling signal MD to the position of the rotor of the motor to control the motor to rotate continuously.

It should be understood that, in the current detection mode, the motor driving controller module 40 continuously provides a current to each of phases of the motor in the current detection mode. The motor driving controller module 40 estimates the voltage zero-crossing point at which the back electromotive force is zero based on the obtained current zero-crossing point through complicated calculations, and accordingly estimates the position of the rotor of the motor. This has an advantage that the motor is driven without interrupting the current of the motor of a fan in the current detection mode, thereby preventing low noise. In contrast, in the voltage detection mode, the current of the motor needs to be interrupted to obtain the voltage zero-crossing point of the back electromotive force and the motor is driven based on the voltage zero-crossing point. However, in the current detection mode, the position of the rotor of the motor is calculated and estimated. Therefore, when the fan is subjected to an external force such that the fan sways or vibrates, the current zero-crossing point floats too much or a response of the system cannot be timely. As a result, the position of the rotor cannot be determined immediately, and can even be misjudged. Under this condition, the fan cannot be accurately controlled, which causes the fan to stall.

Therefore, it is worth noting that, in the embodiment, a mode switching mechanism including a current detection mode and a voltage detection mode is provided. The system of driving the motor in the embodiment is switched between the current detection mode and the voltage detection mode of the mode switching mechanism, which is specifically described as follows.

In the embodiment, the system of driving the motor may further include a current mode driver module 31, which is connected between the driving mode selector module 30 and the motor driving controller module 40. When the current mode driver module 31 detects or determines that the current zero-crossing point falls in the zero-crossing region WINDOW, the current mode driver module 31 determines that the motor of the fan is not subjected to external force, and instructs the driving mode selector module 30 to select to maintain the current detection mode. The motor driving controller module 40 continuingly drives the motor to rotate with low noise in the current detection mode.

For example, the current mode driver module 31 may output a sine wave voltage driving signal based on the obtained current of the coil of the motor and the position of the current zero-crossing point thereof, and the sine wave driving signal is uninterrupted. The sine wave driving signal may include a sine wave signal SIND and a triangular wave signal TRGD. The current mode driver module 30 may allow the current mode driver module 31 to output the uninterrupted sine wave driving signal to the motor driving controller module 40. The motor driving controller module 40 outputs the motor controlling signal MD to the motor to control the motor to rotate according to the uninterrupted sine wave driving signal. For example, the motor driving controller module 40 compares an amplitude level of the sine wave signal SIND with an amplitude level of the triangular wave signal TRGD to output the motor controlling signal MD.

It is worth noting that, when the motor is subjected to the external force or other factors in the current detection mode, the position of the current zero-crossing point of the current flowing through the coil of the motor may be changed, that is, a time point at which the current reaches zero may be changed. As a result, the current obtained or detected by the current mode driver module 31 within the time interval of the zero-crossing region WINDOW is not zero, or the current zero-crossing point does not fall in the zero-crossing region WINDOW. Under this condition, the current mode driver module 31 instructs the current mode driver module 30 to select the voltage detection mode. The motor driving controller module 40 is switched from the current detection mode to the voltage detection mode selected by the current mode driver module 30.

In addition, in the preliminary procedure, the mode switching setting module 20 sets a reference parameter of the back electromotive force of the motor rotating at the preset rotating speed in the preliminary procedure. When the parameter of the back electromotive force is equal to the reference parameter, the motor driving controller module 30 selects the voltage detection mode.

In the embodiment, the system of driving the motor may further include a voltage mode driver module 32, which is connected between the driving mode selector module 30 and the motor driving controller module 40.

For example, the voltage mode driver module 32 may accurately determine the position of the rotor of the motor based on the obtained back electromotive force of the coil of the motor and the position of the voltage zero-crossing point thereof, and accordingly output a voltage driving signal. The voltage driving signal may include the sine wave signal SIND and the triangular wave signal TRGD. The driving mode selector module 30 may allow the voltage driving signal outputted by the voltage mode driver module 32 to be provided to the motor driving controller module 40. The motor driving controller module 40 outputs the motor controlling signal MD to the obtained position in which the rotor of the motor is located to control the motor to rotate according to the voltage driving signal. For example, the motor driving controller module 40 compares the amplitude level of the sine wave signal SIND with the amplitude level of the triangular wave signal TRGD to output the motor controlling signal MD.

When the motor driving controller module 40 drives the motor to rotate, the voltage mode driver module 32 may obtain the back electromotive force generated by the coil of the motor, and determines whether or not the parameter of the back electromotive force is equal to the reference parameter of the motor rotating stably.

When the parameter of the back electromotive force is equal to the reference parameter, the voltage mode driver module 32 determines that the external force to which the motor of the fan is subjected is removed. Under this condition, when the motor rotates stably at the preset rotating speed, the voltage mode driver module 32 instructs the driving mode selector module 30 to select the current detection mode. The motor driving controller module 40 is switched from the voltage detection mode back to the current detection mode selected by the driving mode selector module 30. In the current detection mode, the motor driving controller module 40 drives the motor to rotate with low noise.

Figure 2:
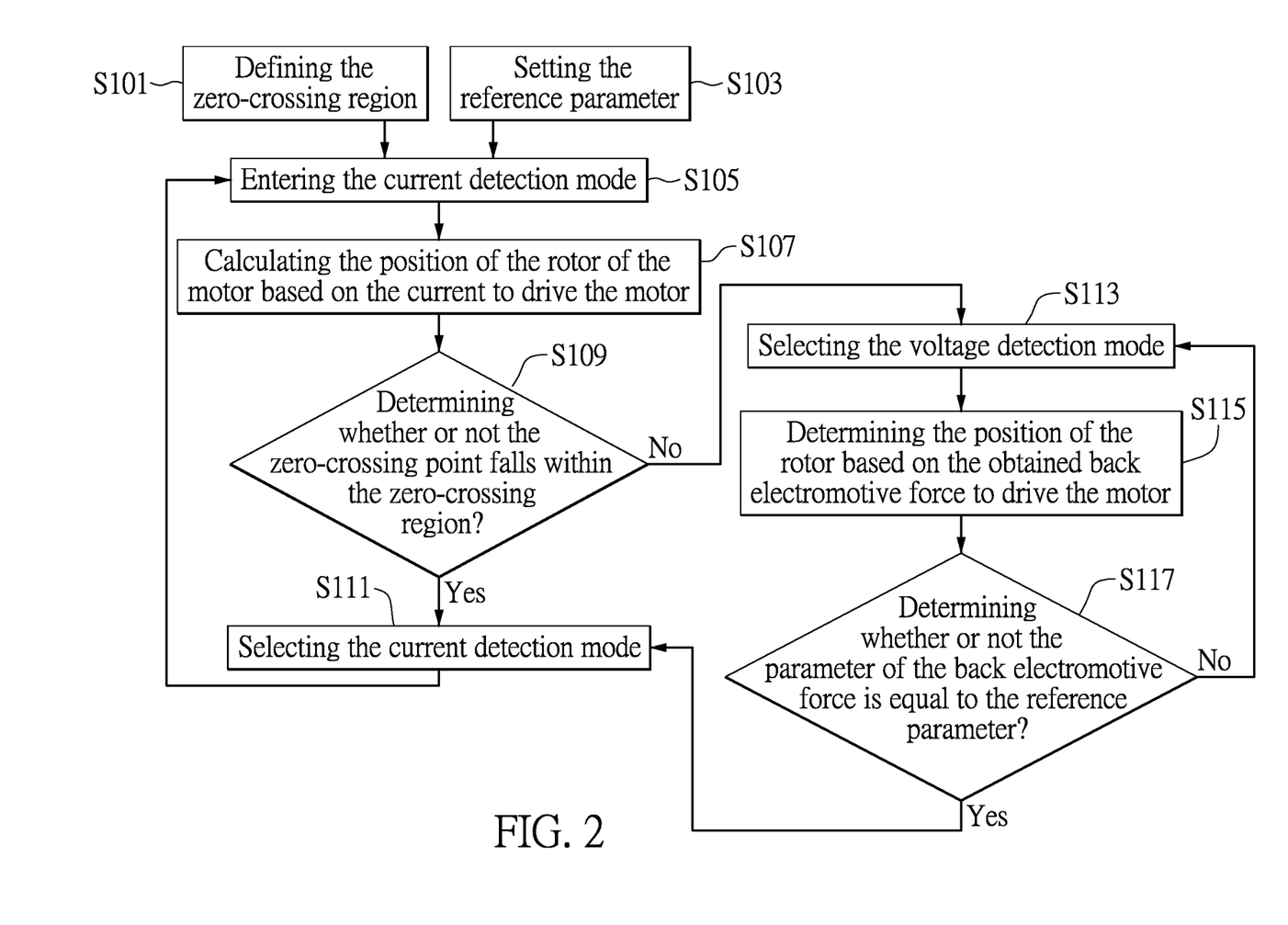
FIG. 2 is a flowchart diagram of a method of driving the motor according to the embodiment of the present disclosure.

Reference is made to FIG. 2, which is a flowchart diagram of a method of driving the motor according to the embodiment of the present disclosure. In the embodiment, the method of driving the motor includes steps shown in FIG. 2, which is specifically described as follows.

First, the preliminary procedure is performed in steps S101 and S103. In the preliminary procedure, the current zero-crossing point of the motor rotating stably is obtained and the zero-crossing region WINDOW is defined based on the current zero-crossing point, which is described in detail as follows.

In step S101, the zero crossing reference module 10 defines the zero-crossing region WINDOW based on the current zero-crossing point of the current of the coil of the motor being the reference point. The reference point is aligned with or delayed with respect to the voltage zero-crossing point of the back electromotive force of the motor stably rotating at the preset rotating speed. In practice, a trigger condition of switching from the current detection mode to the voltage detection mode and a length of the time interval of the zero-crossing region WINDOW may be adjusted according to change of the current of the motor when the fan is subjected to the external force to improve an applicability of the system of driving the motor.

In step S103, the mode switching setting module 20 sets the reference parameter of the back electromotive force of the motor rotating at the preset rotating speed.

After the preliminary procedure is completed, the practical procedure is performed in steps S105 to S117.

In step S105, when the fan is not subjected to the external force and the motor stably rotates at the preset rotating speed, the system of driving the motor enters the current detection mode. In the current detection mode, the motor is detected and driven to rotate with low noise in steps S105 to S111, which are described in detail as follows.

In step S107, the motor driving controller module 40 obtains the current zero-crossing point of the current of the coil of the motor and accordingly estimates the rotor of the position of the motor to control the motor to rotate.

In step S109, the driving mode selector module 30 determines whether or not the current zero-crossing point of the current of the coil of the motor falls in the zero-crossing region WINDOW. If the driving mode selector module 30 determines that the current zero-crossing point falls in the zero-crossing region WINDOW, step S111 is performed. If the driving mode selector module 30 determines that the current zero-crossing point fails to fall in the zero-crossing region WINDOW, step S113 is performed.

In step S111, the driving mode selector module 30 selects the current detection mode and steps S105 to S109 are performed continuingly.

The motor may not stably rotate at the preset rotating speed in the practical procedure. For example, the fan may be subjected to the external force or other environmental factors such that a rotating speed of the motor changes. Under this condition, the position of the rotor of the motor may be misjudged based on the current zero-crossing point of the current. Therefore, when the fan is subjected to the external force or other factors such that the current zero-crossing point of the current flowing through the coil of the motor fails to fall in the zero-crossing region WINDOW, the system of driving the motor enters the voltage detection mode. In the voltage detection mode, the position of the rotor of the motor is accurately determined based on the back electromotive force of the motor to control and correct the rotating speed of the motor, as in the following steps S113 to S117.

In step S113, the driving mode selector module 30 selects the voltage detection mode. At this time, the motor driving controller module 40 is switched to the voltage detection mode from the current detection mode.

In step S115, in the voltage detection mode, the motor driving controller module 40 obtains the voltage zero-crossing point of the back electromotive force of the motor, and accordingly determines the position of the rotor of the motor accurately and correct a motor driving signal to be outputted to the motor to control and correct the motor to rotate at the preset rotating speed.

In step S117, the driving mode selector module 30 determines whether or not the parameter of the back electromotive force of the motor rotating is equal to the reference parameter. That is, the driving mode selector module 30 determines whether or not the fan is subjected to the external force is removed and the fan is stably rotating at the preset rotating speed. If the parameter of the back electromotive force is not equal to the reference parameter, the voltage detection mode in steps S113 to S117 is continuingly performed. If the parameter of the back electromotive force is equal to the reference parameter, the current detection mode in steps S105 to S111 is performed again.

Figure 3A:
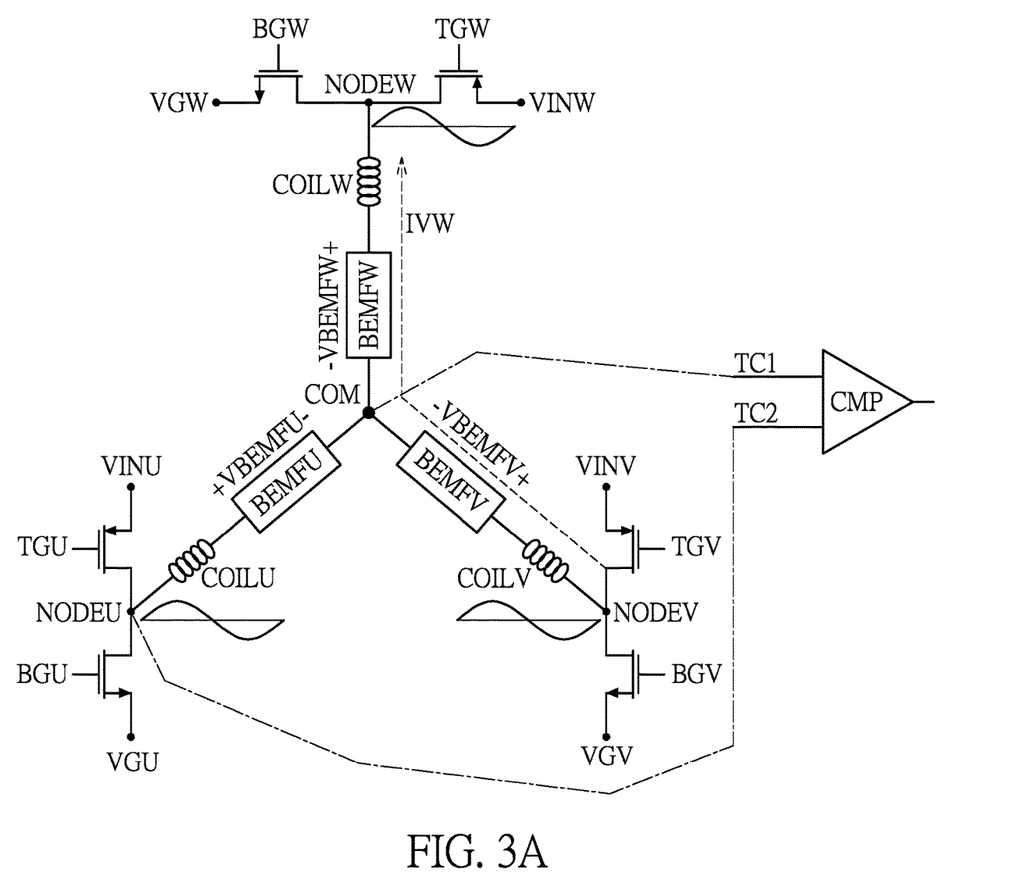
FIG. 3A is a circuit layout diagram of the motor, a motor driving controller module and a comparator according to the embodiment of the present disclosure.
Figure 3B:
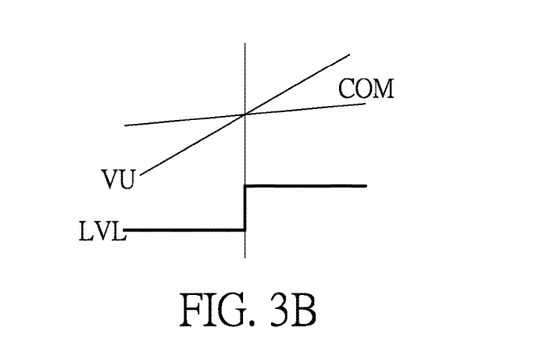
FIG. 3B is a curve diagram of a comparing signal of the comparator and a node voltage of a V phase with respect to a reference voltage and a common node voltage according to the embodiment of the present disclosure.

Reference is made to FIGS. 3A and 3B, wherein FIG. 3A is a circuit layout diagram of the motor, a motor driving controller module and a comparator according to the embodiment of the present disclosure, and FIG. 3B is a curve diagram of a comparing signal of the comparator and a node voltage of a V phase with respect to a reference voltage and a common node voltage according to the embodiment of the present disclosure. As shown in FIG. 3A, in the embodiment, a three-phase motor having a U phase, a V phase and a W phase is applied.

The motor driving controller module 40 shown in FIG. 1 may include an upper bridge switch TGU and a lower bridge switch BGU of the U phase, an upper bridge switch TGV and a lower bridge switch BGV of the V phase, and an upper bridge switch TGW and a lower bridge switch BGW of the W phase as shown in FIG. 3A.

A node NODEU between the upper bridge switch TGU and the lower bridge switch BGU of the U phase is connected to one terminal of a coil COILU of the U phase of the motor. A node NODEV between the upper bridge switch TGV and the lower bridge switch BGV of the V phase is connected to one terminal of a coil COILV of the V phase of the motor. A node NODEW between the upper bridge switch TGW and the lower bridge switch BGW of the W phase is connected to one terminal of a coil COILW of the W phase of the motor. Another terminal of the coil COILU of the U phase, another terminal of the coil COILV of the V phase and another terminal of the coil COILW of the W phase are connected to a common node COM.

In the voltage detection mode, a current of any one of the phases of the motor is interrupted, and the position of the rotor of the motor is determined based on the back electromotive force. In the embodiment, the U phase is exemplified, and the V phase and the W phase of the motor may be applied in the same or similar manner. The upper bridge switch TGU and the lower bridge switch BGU of the V phase are turned off so that a current of the U phase is interrupted and a current IVW flows to the W phase from the V phase of the motor. Under this condition, a first input terminal TC1 of a detector component such as a compactor CMP obtains a voltage of the common node COM, a second input terminal TC2 of the compactor CMP obtains a voltage of the node NODEU of the U phase.

The detector component such as the compactor CMP is included in the voltage mode driver module 32. The compactor CMP compares the voltage of the common node COM with the voltage of the node NODEU of the U phase to output a comparing signal LVL. As shown in FIG. 3B, when the voltage of the node NODEU of the U phase is higher than the voltage of the common node COM, a level of the comparing signal LVL changes from a low level to a high level.

It should be understood that, when the upper bridge switch TGU and the lower bridge switch BGU of the U phase are turned off, the voltage of the node NODEU of the U phase is equal to a sum of the voltage of the common node COM and a voltage VBEMFU of a back electromotive force BEMFU generated by the coil COILU of the U phase. Therefore, when the comparator CMP determines that the voltage of the common node COM is equal to the voltage of the node NODEU of the U phase, the voltage VBEMFU of the back electromotive force BEMFU is zero. Accordingly, it is determined that the rotor is in the U phase.

Compared with the current detection mode, if the position of the rotor is intended to be determined in the voltage detection mode, the current must be interrupted, which causes the fan to generate a higher noise. In the voltage detection mode, when the fan is subjected to the external force and the rotating speed of the fan is unstable, the position of the rotor of the motor can still be accurately determined to correct the rotating speed of the fan.

Therefore, in the embodiment, in general, the system of driving the motor operates in the current detection mode and drives the motor to rotate with low noise. However, when the fan is subjected to the external force such that the position of the rotor cannot be accurately estimated in the current detection mode, the current detection mode is switched to the voltage detection mode. When the fan is subjected to the external force is removed and the motor stably rotates, the system of driving the motor is switched back to the current detection mode from the voltage detection mode.

As a result, when an operation of the motor of the fan is affected by the external force, for example, when the fan is shaken, the external force is in contact with the fan, an ambient airflow changes drastically, an unstable power is supplied to the motor, the position of the rotor of the motor can still be determined correctly and timely, thereby preventing the motor from stalling.

Figure 4:
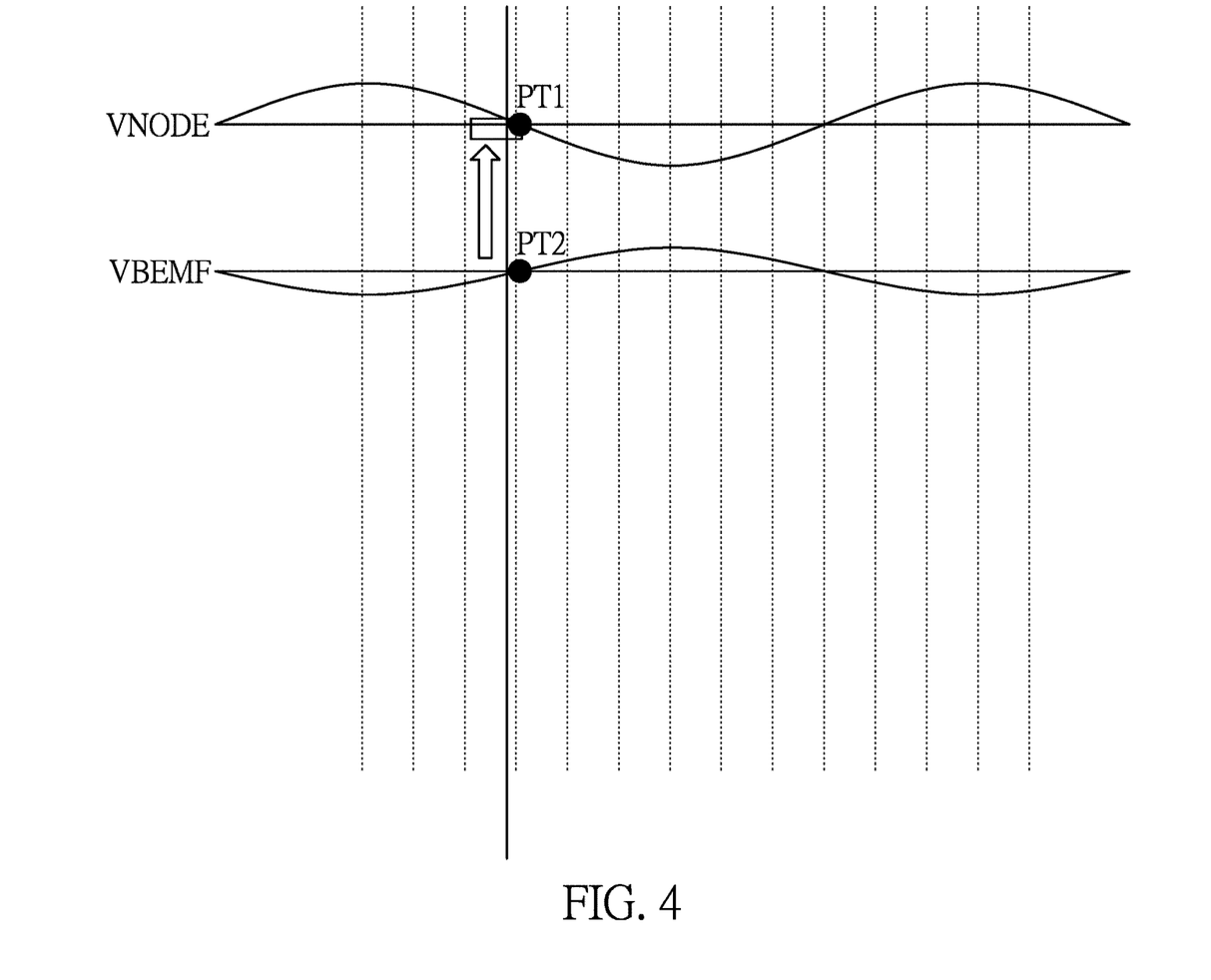
FIG. 4 is a waveform diagram of a node voltage signal and a back electromotive force signal of the V phase of the motor in a voltage detection mode.

Reference is made to FIG. 4, which is a waveform diagram of a node voltage signal and a back electromotive force signal of the V phase of the motor in a voltage detection mode. In the voltage detection mode, the upper bridge switch TGU and the lower bridge switch BGU of the U phase are turned off, and the current flowing through the U phase is interrupted for a period of time. As a result, as shown in FIG. 4, a voltage of a voltage signal VNODE of the node NODEU of the U phase is zero at a voltage zero-crossing point P1. The zero-crossing point P1 is aligned with a voltage zero-crossing point P2 of a back electromotive force signal VBEMF generated by the coil COILU of the U phase of the motor. As shown in FIG. 4, a square box near the voltage zero-crossing point P1 indicates that the current flowing through the coil COILU of the U phase needs to be interrupted for a period of time before the voltage zero-crossing point P1 is aligned with the voltage zero-crossing point P2.

Figure 5:
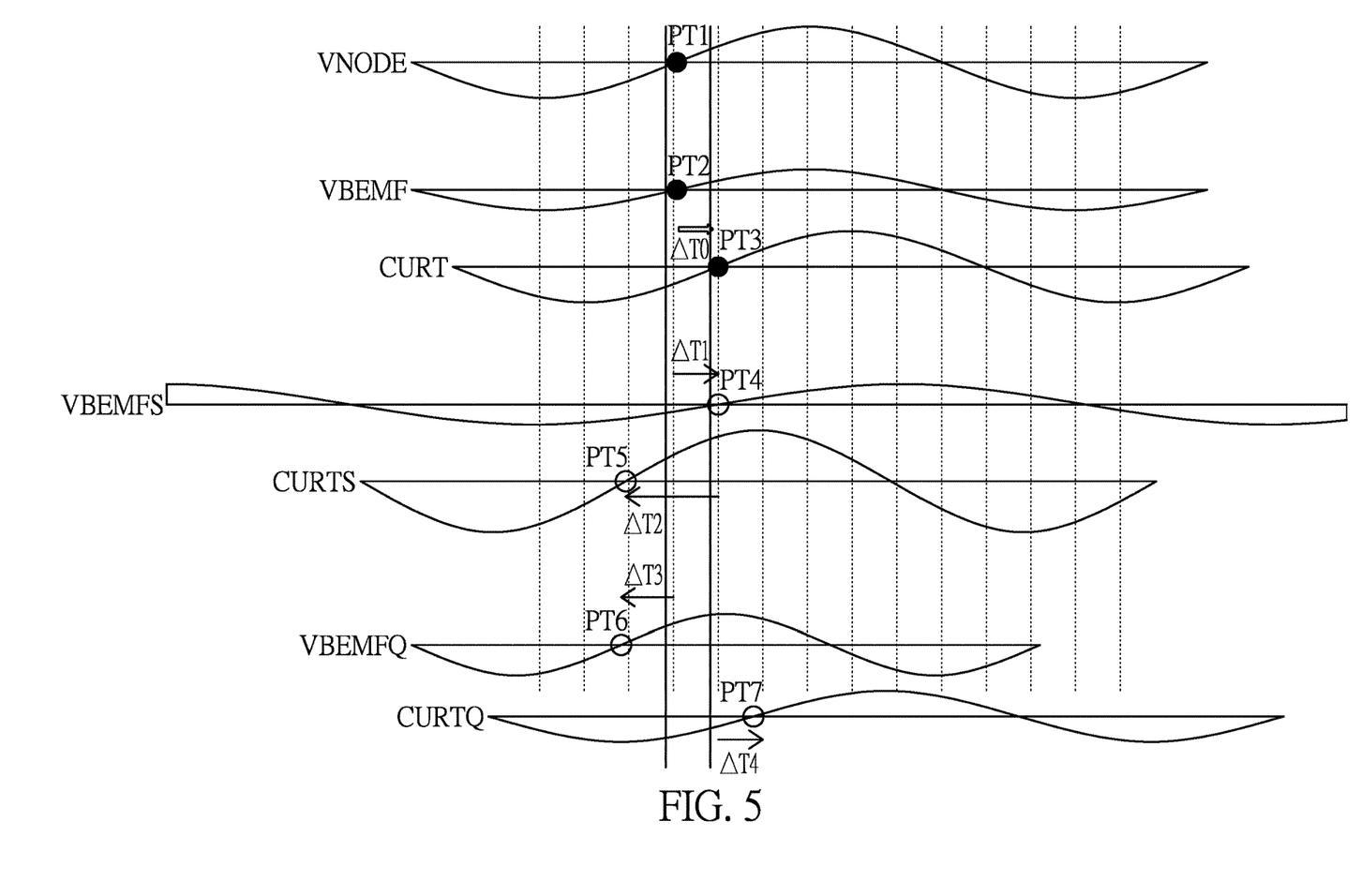
FIG. 5 is a waveform diagram of a node voltage signal, a current signal and a back electromotive force signal of the V phase of the motor in a current detection mode.

Reference is made to FIG. 5, which is a waveform diagram of a node voltage signal, a current signal and a back electromotive force signal of the V phase of the motor in a current detection mode.

As shown in FIG. 5, in the current detection mode, when the motor of the fan rotates stably, a current zero-crossing point PT3 of a current signal CURT flowing through the coil COILU of the motor is delayed with respect to a voltage zero-crossing point PT2 of a back electromotive force VBEMF, which is affected by an inductance characteristic of the coil COILU of the motor. Under this condition, a position of the voltage zero-crossing point PT2 of the back electromotive force signal VBEMF may be estimated based on a position of the current zero-crossing point PT3 of the current signal CURT. A time ΔT0 delay is between the voltage zero-crossing point PT2 and the current zero-crossing point PT3.

However, when the rotating speed of the motor of the fan becomes slow, a voltage zero-crossing point PT4 of a back electromotive force signal VBEMFS is delayed with respect to the voltage zero-crossing point PT2 of the back electromotive force signal VBEMF for a period of time ΔT1. Under this condition, a current zero-crossing point PT5 of the current signal CURT advances with respect to the voltage zero-crossing point PT4 of the back electromotive force signal VBEMFS for a period of time ΔT2. It can be observed that the rotating speed of the motor becomes slow.

Conversely, when the rotating speed of the motor of the fan becomes faster, a voltage zero-crossing point PT6 of a back electromotive force signal VBEMFQ advances with respect to the voltage zero-crossing point PT2 of the back electromotive force VBEMF for a period of time ΔT3. Under this condition, a current zero-crossing point PT7 of a current signal CURTQ is delayed too much with respect to the current zero-crossing point PT6 of the back electromotive force signal VBEMFQ. It can be observed that the rotating speed of the motor becomes faster.

Figure 6:
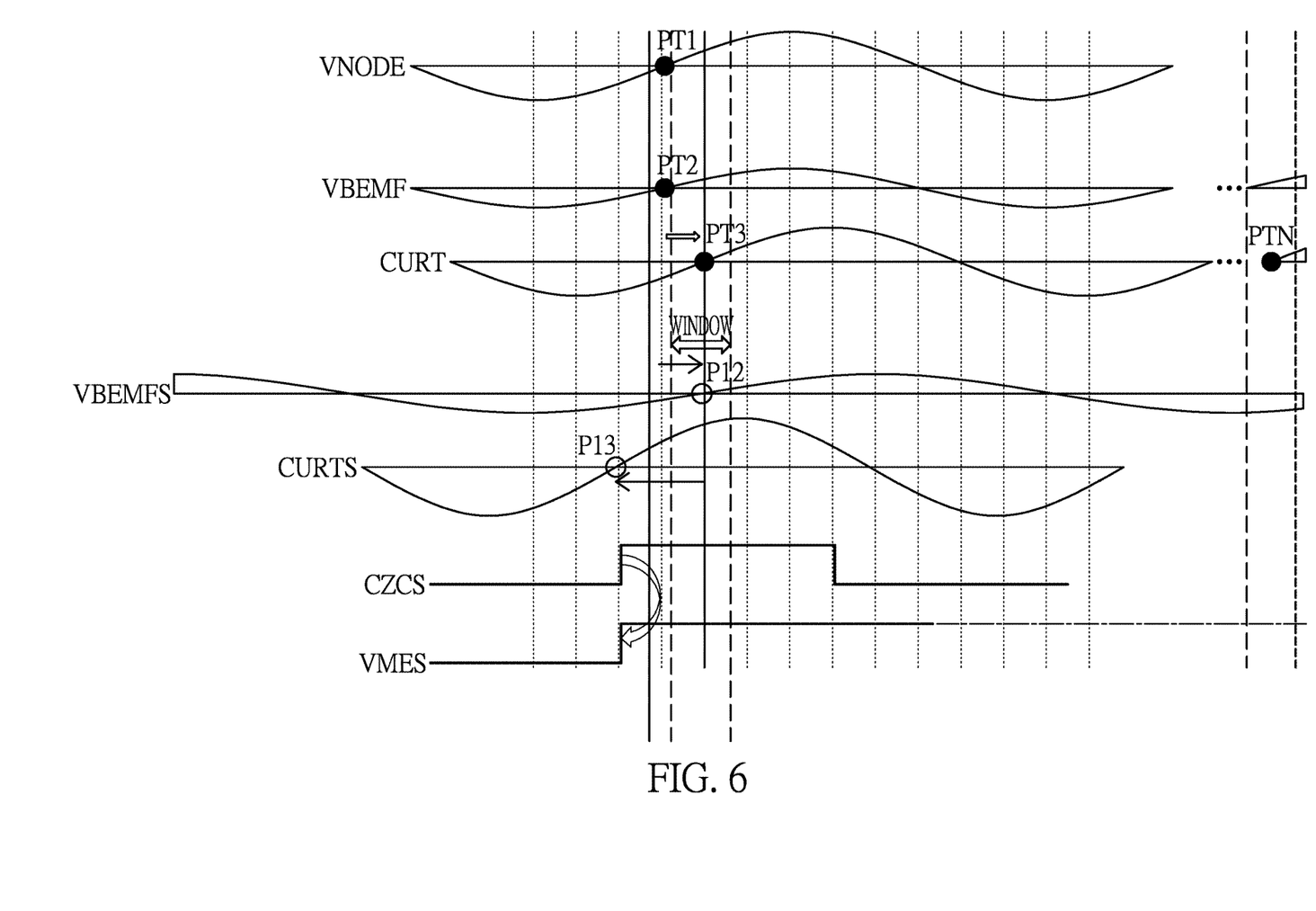
FIG. 6 is a waveform diagram of the node voltage signal, the current signal, the back electromotive force signal, a current zero-crossing signal and a voltage mode enabling signal of the V phase of the motor in a mode switching mechanism of the voltage detection mode and the current detection mode according to the embodiment of the present disclosure.

Reference is made to FIG. 6, which is a waveform diagram of the node voltage signal, the current signal, the back electromotive force signal, a current zero-crossing signal and a voltage mode enabling signal of the V phase of the motor in a mode switching mechanism of the voltage detection mode and the current detection mode according to the embodiment of the present disclosure.

It is worth noting that, the mode switching mechanism is provided in the embodiment. For example, the system of driving the motor is switched between the voltage detection mode shown in FIG. 4 and the current detection mode shown in FIG. 5, which is specifically described as follows.

The motor of the fan may be subjected to an environment, driving parameter conditions, a state of the motor or other factors, such that the position of the current zero-crossing point PT3 moves within a certain time range. That is, the current zero-crossing point PT3 exemplified in the embodiment is an ideal time point at which the current of the motor is zero when the motor rotates stably. However, in practice, when the motor rotates, the current zero-crossing point of the current signal CURT flowing through the coil COILU of the motor may slightly advance or slightly delay with respect to the current zero-crossing point PT3.

Therefore, it is worth noting that, in the preliminary procedure, the zero crossing reference module 10 shown in FIG. 1 defines the zero-crossing region WINDOW shown in FIG. 6, based on the current zero-crossing point PT3 of the current signal CURT as a reference point. The position of the current zero-crossing point PT3 is delayed with respect to the position of the voltage zero-crossing point PT2. In the subsequent practical procedure, when the current zero-crossing point of the current signal CURT of the coil COILU of the motor falls in the zero-crossing region WINDOW, it is determined that the motor rotates stably.

A width of the defined zero-crossing region WINDOW may be depend on sensitivities of different motors to external forces. The sensitivity of the motor to the external force may be related to an inertia of the motor or other factors. For example, in the current detection mode, when the motor is subjected to a slight external force, the position of the rotor of the motor may not be easily determined, such that the fan cannot be driven to rotate based on the position of the rotor. Under this condition, the zero-crossing region WINDOW having a smaller width is defined, and vice versa.

In the embodiment, only one zero-crossing region WINDOW is exemplified. However, it should be understood that, after the current zero-crossing point PT3 of the current signal CURT appears, a current may be zero again during a time interval of the next cycle and a next zero-crossing region WINDOW may be defined in the next cycle, and so on.

For example, the current zero-crossing point is taken as a center point on a waveform of the current signal CURT. The center point extends respectively to a left side and a right side at an angle to define the zero-crossing region WINDOW. The zero-crossing region WINDOW may be referred to as a buffer detection region of the zero-crossing point.

After the preliminary procedure is completed, the practical procedure is performed. In the current detection mode, the current signal flowing through the coil of the motor is detected within the time interval of the zero-crossing region WINDOW. As shown in FIG. 6, a current zero-crossing point P13 of the current signal CURTS of the coil COILU of the motor is not aligned with the current zero-crossing point PT3 of the motor rotating stably, and fails to fall in the zero-crossing region WINDOW. The current zero-crossing point P13 advances with respect to the zero-crossing region WINDOW. Under this condition, when the current signal CURTS flows through the coil COILU of the motor, the motor rotates too slowly.

When the fan is subjected to the external force so that the current zero-crossing point P13 of the current signal CURTS of the coil COILU of the motor of the fan fails to fall in the zero-crossing region WINDOW, the current of the current signal CURTS is detected to be not zero within the time interval of the zero-crossing region WINDOW. That is, the current zero-crossing point is not detected. Under this condition, a voltage zero-crossing point P12 of a back electromotive force VBEMFS cannot be correctly estimated based on the current zero-crossing point P13.

It should be understood that, if the voltage zero-crossing point of the back electromotive force VBEMFS cannot be estimated based on the current zero-crossing point to estimate the position of the rotor of the motor, the motor of the fan cannot be accurately controlled, which causes the fan to stall. In order to avoid the stalling of the fan, when the current zero-crossing point is not detected within the time interval of the zero-crossing region WINDOW, or the detected current zero-crossing point fails to fall in the zero-crossing region WINDOW, the driving mode selector module 30 selects to switch from the current detection mode to the voltage detection mode.

As shown in FIG. 6, a zero-crossing point detecting signal CZCS changes from a low level to a high level at the current zero-crossing point P13. At this time, a voltage mode enabling signal VMES changes from a low level to a high level in response to the zero-crossing point detecting signal CZCS. For example, when the driving mode selector module 30 receives the voltage mode enabling signal VMES from the current mode driver module 31, the driving mode selector module 30 selects to switch from the current detection mode to the voltage detection mode.

In the voltage detection mode, the motor driving controller module 40 determines which one of coils of the three phases of the motor such as the U phase, the V phase and the W phase of the three-phase motor generates a back electromotive force that is zero. The motor driving controller module 40 accurately determines the rotor of the motor is in the phase in which the back electromotive force is zero. The driving mode selector module 30 outputs the motor controlling signal MD to control the motor to rotate based on the position of the rotor of the motor, thereby correcting an unstable rotating speed of the motor that is caused by the external force.

In addition, the mode switching setting module 20 may set the reference parameter of the back electromotive force of the motor rotating at the preset rotating speed in the preliminary procedure. The reference parameter as a condition for triggering the switching from the voltage detection mode to the current detection mode may depend on a response time of the system of driving the motor of the embodiment in the voltage detection mode. In this way, a time length during which the system operates in the voltage detection mode is determined. Therefore, it is ensured that the position of the rotor is detected and the motor controlling signal MD such as a waveform pattern for driving the motor is corrected, thereby increasing the applicability of the system of driving the motor.

For example, the reference parameter includes a time difference between a period of the back electromotive force signal VBEMF and a next period thereof, and the time difference is smaller than a time difference threshold. In another example, the reference parameter includes a time difference between each two successive periods of the back electromotive force signal VBEMF within a predetermined time, and the time difference is smaller than a time difference threshold.

In the voltage detection mode, when the driving mode selector module 30 determines that the parameter of the back electromotive force of the coil of the motor is equal to the reference parameter set by the mode switching setting module 20, the driving mode selector module 30 selects to switch from the voltage detection mode back to the current detection mode. For example, when the motor rotates stably at the preset rotating speed for a preset continuous stabilization time and a period of the back electromotive force is equal to a next period thereof, the driving mode selector module 30 selects to switch from the voltage detection mode back to the current detection mode. In the voltage detection mode, the motor is driven to rotate with low noise.

In summary, the present disclosure provides the system and the method of driving the motor. When the system detects that the current zero-crossing point of the current of the motor falls in the zero-crossing region to determine the motor rotates stably, the motor is driven to rotate with low noise in the current detection mode. However, when the current zero-crossing point of the current of the motor fails to fall in the zero-crossing region, the system determines that the fan may be subjected to the external force such that the fan does not rotate stably, the present disclosure selects to switch from the current detection mode to the voltage detection mode. In the voltage detection mode, the voltage zero-crossing point of the back electromotive force of the motor is detected to accurately determine the position of the rotor of the motor.

That is, the present disclosure provides the mode switching mechanism of the voltage detection mode and the current detection mode, which is applied to solve the problem that the motor stalls in the current detection mode when the fan is subjected to the external force of a common motor driver system. Furthermore, the present disclosure can adjust conditions of switching the multiple mode switching mechanisms according to characteristics of different types of fans or motors to ensure that the waveform of the driving signal is corrected such that the motor is driven to rotate stably.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A system of driving a motor, comprising:
a zero crossing reference module configured to define a zero-crossing region based on a current zero-crossing point of a current of a coil of the motor as a reference point, which is aligned with or delayed with respect to a voltage zero-crossing point of a back electromotive force of the motor rotating at a preset rotating speed, in a preliminary procedure;
a mode switching setting module configured to set a reference parameter of the back electromotive force of the motor rotating at the preset rotating speed in the preliminary procedure;
a driving mode selector module connected to the zero crossing reference module and the mode switching setting module, wherein when the driving mode selector determines that the current zero-crossing point fails to fall in the zero-crossing region in a current detection mode, the driving mode selector selects to switch from the current detection mode to a voltage detection mode, and when the driving mode selector determines that a parameter of the back electromotive force is equal to the reference parameter in the voltage detection mode, the driving mode selector selects to switch back to the current detection mode; and
a motor driving controller module connected to the driving mode selector module, configured to calculate a position of a rotor of the motor based on the current to drive the motor when the current detection mode is selected, and configured to determine the position of the rotor based on the back electromotive force to drive the motor when the voltage detection mode is selected.

2. The system according to claim 1, wherein when the driving mode selector module determines that the current zero-crossing point of the motor rotating falls in the zero-crossing region, the driving mode selector module selects the current detection mode and the motor rotates in the current detection mode.

3. The system according to claim 1, further comprising:
a current mode driver module connected between the driving mode selector module and the motor driving controller module;
wherein when the current mode driver module determines that the current zero-crossing point falls in the zero-crossing region, the current mode driver module instructs the driving mode selector module to select to maintain the current detection mode;
wherein when the current mode driver module determines that the current zero-crossing point fails to fall in the zero-crossing region, the current mode driver module instructs the driving mode selector module to select to switch to the voltage detection mode.

4. The system according to claim 1, further comprising: a voltage mode driver module connected between the driving mode selector module and the motor driving controller module;
wherein when the voltage mode driver module determines that the parameter of the back electromotive force is not equal to the reference parameter, the voltage mode driver module instructs the driving mode selector module to select to maintain the voltage detection mode;
wherein when the voltage mode driver module determines that the parameter of the back electromotive force is equal to the reference parameter, the voltage mode driver module instructs the driving mode selector module to select to switch from the voltage detection mode back to the current detection mode.

5. The system according to claim 1, wherein the reference parameter includes a time difference between a period of a signal of the back electromotive force and a next period thereof, and the time difference is smaller than a time difference threshold.

6. The system according to claim 1, wherein the reference parameter includes a time difference between each two successive periods of a signal of the back electromotive force within a predetermined time, and the time difference is smaller than a time difference threshold.

7. A method of driving a motor, comprising the following steps:
(a) defining, by a zero crossing reference module, a zero-crossing region based on a current zero-crossing point of a current of a coil of the motor as a reference point, wherein the current zero-crossing point is aligned with or delayed with respect to a voltage zero-crossing point of a back electromotive force of the motor rotating at a preset rotating speed;
(b) setting a reference parameter of the back electromotive force of the motor rotating at the preset rotating speed by a mode switching setting module;
(c) calculating a position of a rotor of the motor based on the current to drive the motor in a current detection mode by a motor driving controller module;
(d) determining, by a driving mode selector module, whether or not the current zero-crossing point of the motor rotating falls in the zero-crossing region, in response to determining that the current zero-crossing point falls in the zero-crossing region, selecting to maintain the current detection mode and continuingly performing the previous step (c), and in response to determining that the current zero-crossing point fails to fall in the zero-crossing region, selecting to switch from the current detection mode to a voltage detection mode;
(e) determining the position of the rotor based on the back electromotive force to drive the motor in the voltage detection mode by the motor driving controller module; and
(f) determining, by the driving mode selector module, whether or not a parameter of the back electromotive force is equal to the reference parameter in the voltage detection mode, in response to determining that the parameter of the back electromotive force is not equal to the reference parameter, selecting to maintain the voltage detection mode, and in response to determining that the parameter of the back electromotive force is equal to the reference parameter, selecting to switch back to the current detection mode and then performing step (c).

8. The method according to claim 7, further comprising a step of:
determining, by the current driving controller module, whether or not the current zero-crossing point falls in the zero-crossing region, in response to determining that the current zero-crossing point falls in the zero-crossing region, instructing the driving mode selector module to select to maintain the current detection mode, and in response to determining that the current zero-crossing point fails to fall in the zero-crossing region, instructing the driving mode selector module to select to switch from the current detection mode to the voltage detection mode.

9. The method according to claim 7, further comprising a step of:
determining, by the voltage mode driver module, whether or not the parameter of the back electromotive force is equal to the reference parameter, in response to determining that the parameter of the back electromotive force is not equal to the reference parameter, instructing the driving mode selector module to select to maintain the voltage detection mode, and in response to determining that the parameter of the back electromotive force is equal to the reference parameter, instructing the driving mode selector module to select to switch back to the current detection mode.

10. The method according to claim 7, wherein the reference parameter includes a time difference between a period of a signal of the back electromotive force and a next period thereof, and the time difference is smaller than a time difference threshold.

11. The method according to claim 7, wherein the reference parameter includes a time difference between each two successive periods of a signal of the back electromotive force within a predetermined time, and the time difference is smaller than a time difference threshold.

* * * * *